G. G. ANDERSON.
ANIMAL TRAP.
APPLICATION FILED AUG. 26, 1921.
1,429,011.
Patented Sept. 12, 1922.
2 SHEETS—SHEET 1.
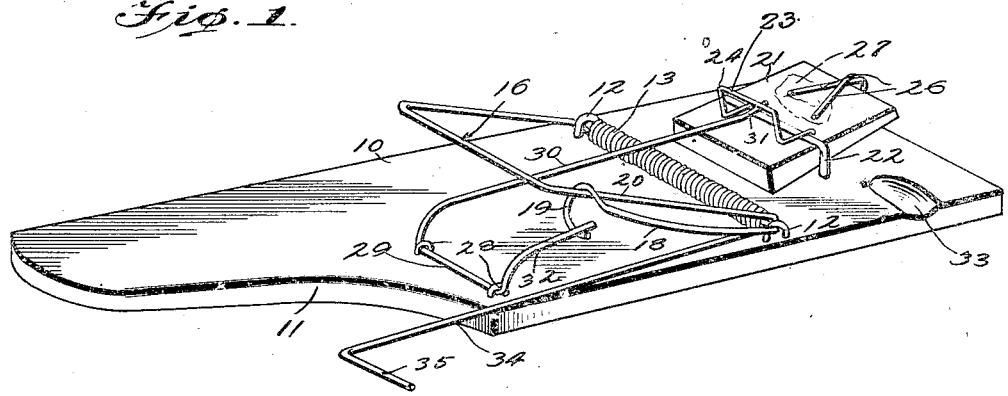
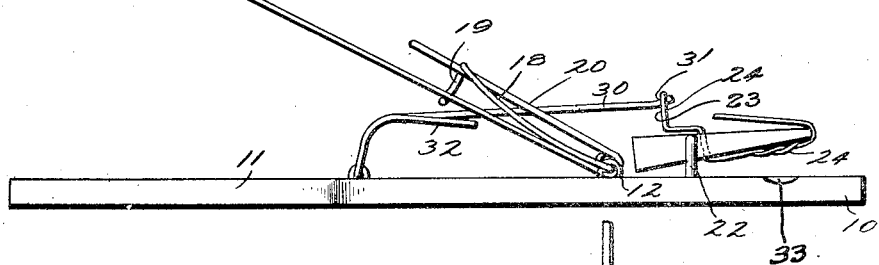
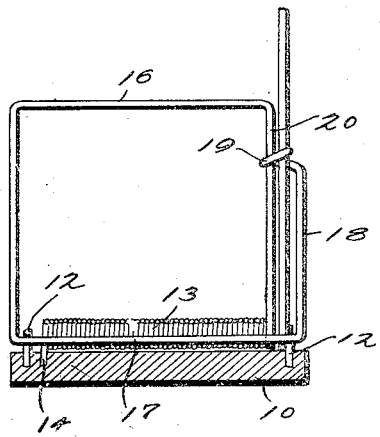
WITNESSES
INVENTOR
G. G. Anderson,
BY
ATTORNEYS Patented Sept. 12, 1922.

1,429,011

UNITED STATES PATENT OFFICE.

GUS GEORGE ANDERSON, OF MIAMI, ARIZONA.

ANIMAL TRAP.

Application filed August 26, 1921. Serial No. 495,582.

*To all whom it may concern:*

Be it known that I, GUS GEORGE ANDERSON, a citizen of the United States, and a resident of Miami, in the county of Gila and State of Arizona, have invented certain new and useful Improvements in Animal Traps, of which the following is a specification.

This invention relates to an animal trap.

Among the objects of this invention is to provide a trap of the above character particularly adapted for trapping mice, rats or the like, which may be set without danger, and which is extremely sensitive to being tripped.

It is also an object that the trap be durable and inexpensive to manufacture.

The invention is illustrated by way of example in the accompanying drawings, in which:

Figure 1 is a perspective plan view of a trap constructed in accordance with the invention and showing the same when set.

Figures 4 and 5 are views similar to Figure 3 and illustrating the set lever in different positions during the setting of the trap.

Figure 6 is a vertical central transverse sectional view of the trap and showing the set lever when disposed vertically in the course of setting the trap.

Figure 2:
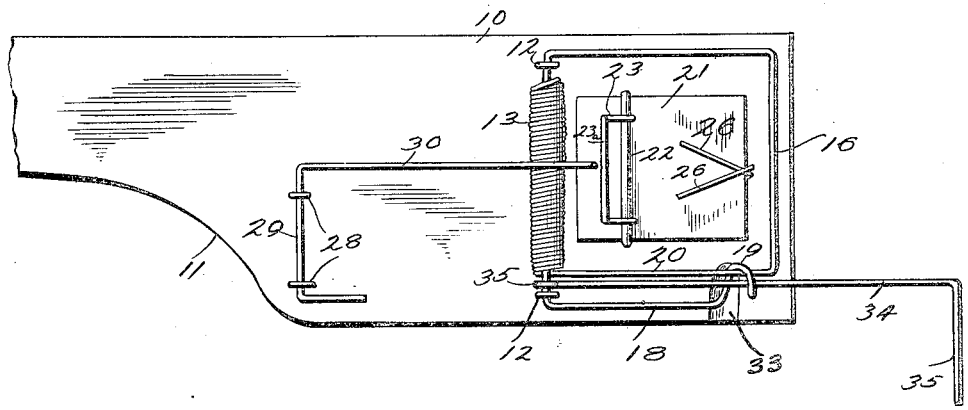
Figure 2 is a top plan view of the same and showing the trap when tripped.

Referring to the drawings more particularly 10 indicates generally a base plate which is substantially rectangular in shape and having one end cut on a curved line as at 11 the purpose of which will later become apparent. A pair of staples 12 are driven into the base plate one adjacent each longitudinal edge.

Between the staples there is positioned a coil spring 13 the one end of which is embedded in the plate 10 as at 14 while the other end is extended to form a substantially square frame generally indicated by the reference numeral 16, the side 17 of which extends beneath the bridge portions of the staples 12 and then terminates in a portion 18 having formed upon the end thereof a hook 19 which is hooked about the adjacent side 20 of the square frame 16.

Figure 3:
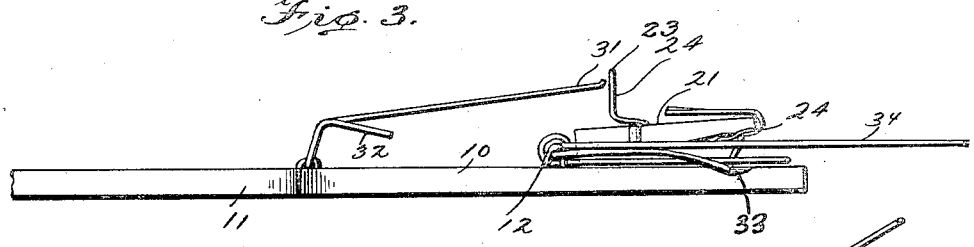
Figure 3 is a side elevation of the same.
Figure 4:
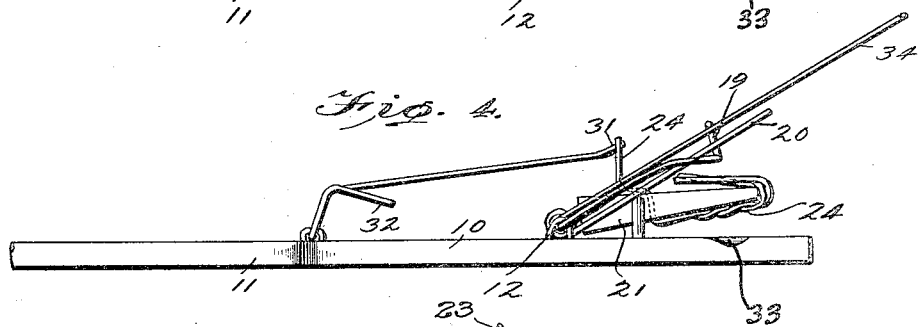
Figure 7:
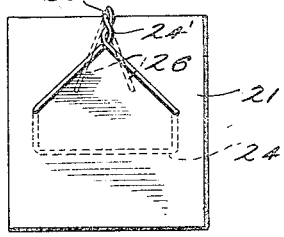
Figure 7 is a bottom plan view of the trip plate.

Forward of the coil 13 there is positioned the trip plate 21 said plate having a transverse groove in the top surface thereof adjacent its rear end adapted to accommodate the bridge portion of a U-shaped member 22, the leg portions of which are driven into the base plate 10. A wire of suitable resiliency is bent to form a U-shaped latch 23, the legs of which are disposed substantially vertical as at 24 Figures 3 and 4 and then bent forwardly and then downwardly and extended through the trip plate 21. In the lower face of the trip plate the legs 24 are twisted together as at 24 and then bent upon the top surface of said plate and the terminals 26 thereof bent to distend from each other. Also the terminals 26 are slightly spaced from the upper face of the trip plate 21 so that a bait 27, Figure 1 may be placed and held there beneath.

Rearward of the coil spring 13 there is driven into the base plate a second pair of staples 28. These staples turnably hold a wire shaft 29 which terminates at its one end in an elongated keeper wire 30 which is formed at its outer end with a slightly upwardly curved portion as at 31. The other end of the wire shaft 29 terminates in an upwardly and forwardly extending trigger portion 32.

The base plate 10 is also provided near its forward end and upon one side thereof with a recess 33 which is preferably of the shape shown and adapted to receive the hook 19 when the trap is tripped as shown in Figures 1 and 2, also the side 13 of the square wire frame 16 has pivotally connected thereto the one end of a rod or wire 34 as at 35 best shown in Figure 2.

In the operation of the present device when it is desired to set the trap the lever rod 34 is positioned beneath the hook 19 as shown in Figure 2, the forward end of the keeper wire 30 is engaged beneath the U-shaped latch 34 and then the lever rod 34 is swung upwardly and rearwardly until the hook 19 may be brought beneath the extension 32 of the keeper wire. The bait may be placed upon the trip plate 21 as indicated at 27 in Figure 1 previous to moving the striker or frame wire 16 to the position shown in Figure 1. As is obvious when a mouse or rat steps or otherwise presses upon the trip plate 21 in attempting to steal the bait the forward end of the trip plate will move downwardly and release the keeper wire 30 whereupon the frame or striker 16 will swing forward under the tension of the coil spring 13 and trap the animal.

In the operation of the present trap when it is desired to set the same the lever rod 34 is positioned beneath the hook 19 as best shown in Figure 2 and then the lever rod is swung upwardly and rearwardly until the hook 19 is positioned as shown in Figure 1. The portion 32 of the wire 29 is then brought to engage with the hook 19 while the portion 30 engages with the bridge portion of the trigger 23 carried by the trip plate 21. A bait 27 is of course positioned upon the trip plate 21 previous to the setting of the trap and as is obvious when a mouse or rat steps or otherwise presses upon the plate 27 when attempting to steal the bait, the forward end thereof will move downwardly and free the wire portion 30 whereupon the frame 16 will swing forwardly under the tension of the coil spring 13 and trap and kill the mouse.

As is obvious the lever rod 34 provides a convenient means for setting the trap without danger to the operator. Also it will be observed that by the provision of the recess 33, that the frame 16 may lie flush with the top surface of the plate 10 and eliminate any possibility of escape for the trapped animal. It will be further observed that the trip plate 21 tapers toward its forward end and that the point of support therefor is adjacent the rear end thereof and thus affecting substantially a balance of the same when a bait 27 is positioned. As is obvious by this construction the plate will tip with a slight pressure upon the forward end of plate 21.

While I have shown and described the preferred construction, combination and arrangement of parts of my invention, I wish it to be understood that I am aware of the fact that the same may be changed by those skilled in the art but without departing from the spirit of my invention as indicated by the appended claims.

I claim :—

1. In a trap of the character described, a base, a bait plate, a U-shaped member having its terminals secured to the base and its bridge portion extending across the bait plate adjacent one end thereof, a U-shaped wire having its legs extending through the bait plate and adjacent one side of the bridge portion of the first named U-shaped member and its bridge portion being disposed above the bait plate and upon the opposite side of the bridge portion of the first named U-shaped member, whereby to support the bait plate by the leg portions of the last named U-shaped wire existing between its bridge portion and top surface of the bait plate, and the bridge portion of the U-shaped wire serving as a keeper.

2. In a trap of the character described, a base, a bait plate, a U-shaped member having its terminals secured to the base and its bridge portion extending across the bait plate adjacent one end thereof, a U-shaped wire having its legs extending through the bait plate and adjacent one side of the bridge portion of the first named U-shaped member and its bridge portion being disposed above the bait plate and upon the opposite side of the bridge portion of the first named U-shaped member, whereby to support the bait plate by the leg portions of the last named U-shaped wire existing between its bridge portion and top surface of the bait plate, the bridge portion of the U-shaped wire serving as a keeper, and the leg portions of the U-shaped wire being extended forwardly upon the bottom surface of the bait plate to its other end and then brought upwardly and bent forwardly to serve as a means for holding a bait upon said bait plate.

GUS GEORGE ANDERSON.